B. N. RAMSEY.
VEHICLE WHEEL.
APPLICATION FILED JULY 11, 1917.
1,371,980.
Patented Mar. 15, 1921.
2 SHEETS—SHEET 1.
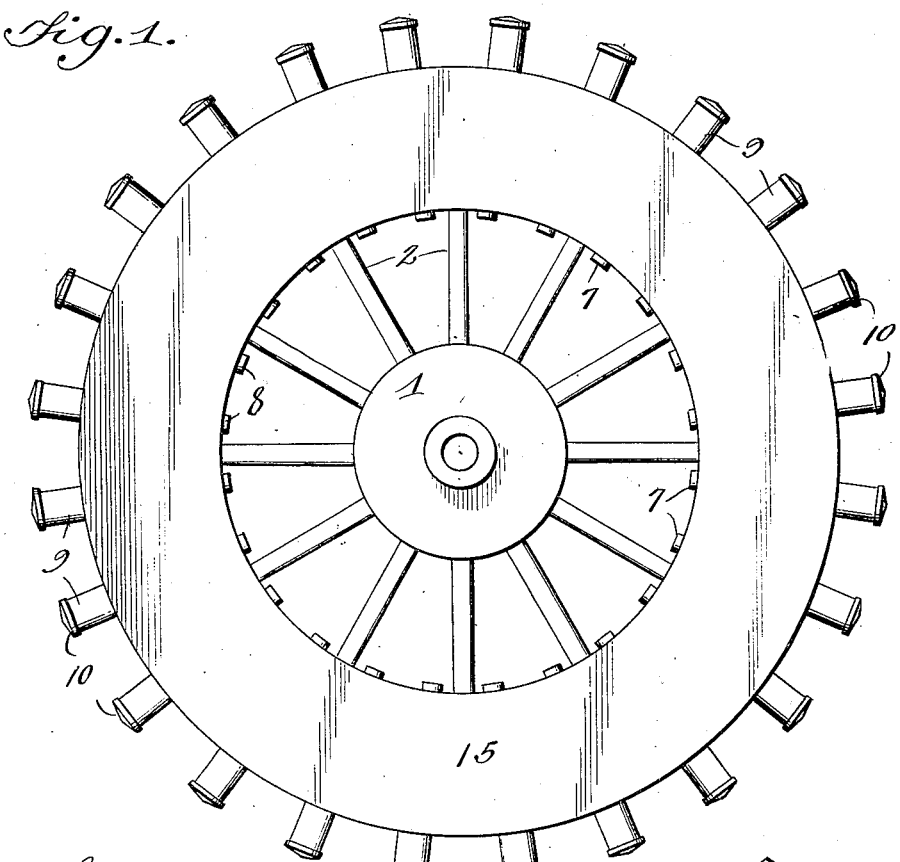
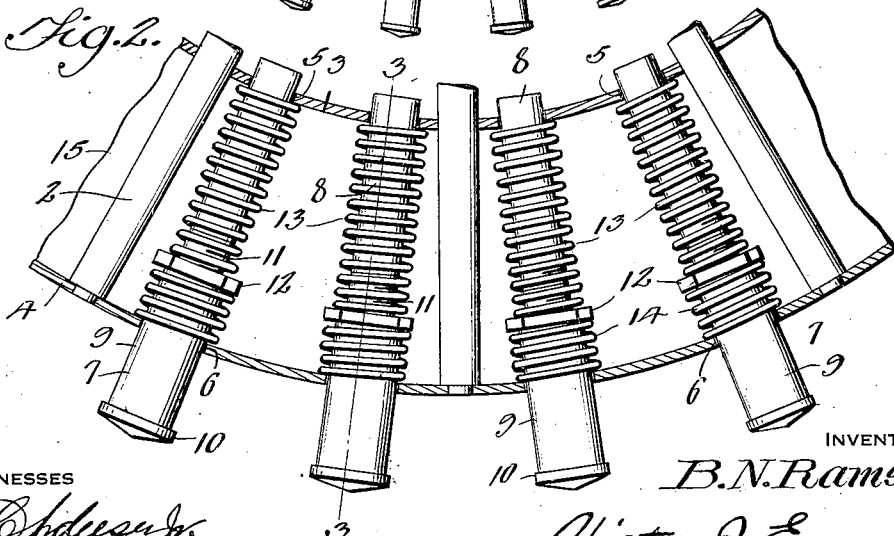
WITNESSES
INVENTOR
B. N. Ramsey,
BY Victor J. Evans
ATTORNEY

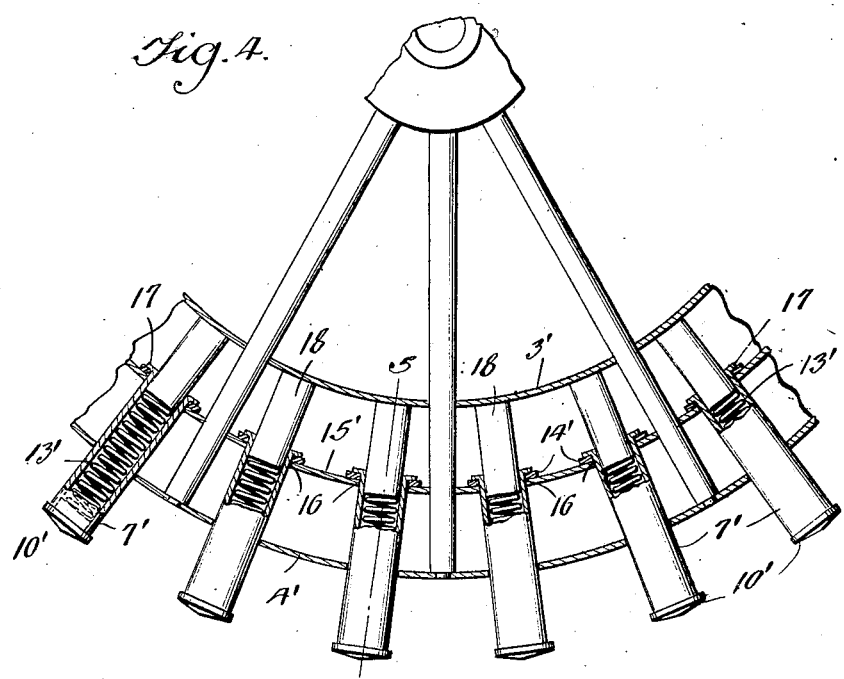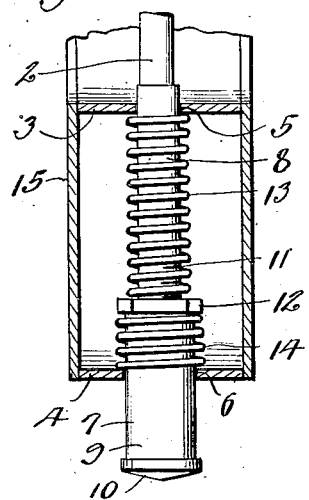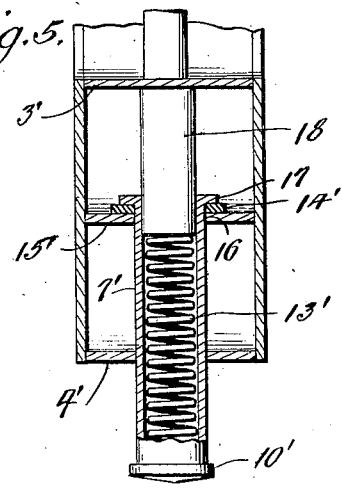

UNITED STATES PATENT OFFICE.

BRINT N. RAMSEY, OF LAKE CITY, COLORADO.

VEHICLE-WHEEL.

1,371,980. Specification of Letters Patent. Patented Mar. 15, 1921.

Application filed July 11, 1917. Serial No. 179,899.

*To all whom it may concern:*

Be it known that I, BRINT N. RAMSEY, a citizen of the United States, residing at Lake City, in the county of Hinsdale and State of Colorado, have invented new and useful Improvements in Vehicle-Wheels, of which the following is a specification.

This invention relates to vehicle wheels, the object in view being to produce a wheel embodying a multiplicity of independently acting tread forming members or plungers, the body of the wheel having means for properly guiding the movements of said tread forming plungers or members to insure the proper operation thereof.

A further object of the invention is to provide means for cushioning said tread forming plungers and yieldingly supporting the same so that they will efficiently support the load imposed thereon and absorb all ordinary road shocks, preventing the transmission thereof to the body of the wheel and to the vehicle in conjunction with which the wheel is used.

The invention is adapted for light loads or heavy loads, it being apparent that the number of tread forming plungers may be increased or diminished according to the use to which the wheel is to be put and the load to be imposed thereon.

With the above and other objects in view, the invention consists in the novel construction, combination and arrangement of parts, herein described, illustrated and claimed.

In the accompanying drawings:—

Figure 1 is a side elevation of a sufficient portion of a vehicle wheel to illustrate the improved construction;

Fig. 2 is a longitudinal section through the lower portion of the wheel illustrating the operation of the tread forming members;

Fig. 3 is a radial section on the line 3—3 of Fig. 2.

Fig. 4 is a fragmentary vertical longitudinal section showing a construction of wheel embodying the same principle but adapted to heavier loads; and Fig. 5 is a radial section on the line 5—5 of Fig. 4.

Referring to the drawings 1 designates the hub of the improved wheel, 2 the spokes thereof, 3 an inner rim and 4 an outer fixed rim, both rims 3 and 4 being fixedly and rigidly secured to the spokes 2. The wheel thus far described thus constitutes a unitary structure of parts which have a fixed relation to each other.

The inner rim is formed with a plurality of guide openings 5 and the outer rim is also formed with a corresponding number of guide holes 6 which are in radial alinement with the holes 5 but which, as shown in Fig. 2, are larger than the holes 5 in the inner rim 3. In conjunction with each radially alining pair of holes 5 and 6, I employ a tread forming plunger or member 7 having an inner portion 8 preferably round in cross section, and an outer portion 9 of a greater diameter than the inner portion 8. The outer portion of each tread forming plunger is preferably of tubular formation as shown in Fig. 5 and the outer end thereof is closed by means of a head 10 which is fastened in place in relation to the part 9 of the plunger by any suitable means so that it may be removed and replaced with a new head whenever necessary. The larger portion 9 of each plunger 7 is slidable freely through the opening 6 in the outer rim and the reduced inner portion 8 of said plunger is freely slidable through the respective opening 5 in the inner rim 3.

The inner reduced portion 8 of each tread forming plunger has a threaded portion 11 upon which is threaded a nut 12. A load supporting or carrying spring 13 is interposed between the inner face of the nut 12 and the inner rim 3. Therefore by adjusting the nut 12 the spring 13 may be placed under greater or less compression in proportion to the load to be sustained by the wheel as a whole. Between the nut 12 and the outer rim 4, there is placed a cushion 14 which in Fig. 2 is shown in the form of a coiled spring encircling the larger portion 9 of the plunger. The nut 12 thus acts also as a means for limiting the outward movement of the respective plunger 7, and the cushion 14 renders the respective plunger silent in operation.

In some cases it may be found desirable to inclose the space between the outer and inner rims by means of annular housing plates 15 as shown in Fig. 1 and these plates may be, if desired, formed integrally with either the inner or outer rim. Provision should of course be made whereby access may be obtained to the space between said outer and inner rims and between the housing plates 15 in order that broken plungers and springs may be replaced from time to time as may be found necessary. The heads 10 are preferably formed of case hardened steel so as to sustain long wear. However any suitable material may be employed in the formation of the heads 10 and any desired shape or configuration may be imparted thereto.

In wheels adapted for heavy duty such as wheels used on trucks for heavy hauling purposes, the construction illustrated in Figs. 4 and 5 may be resorted to. In said Figs. 4 and 5 it will be noted that in addition to the outer rim 4' and the inner rim 3', I employ an intermediate rim 15' lying between and concentrate to said outer and inner rims. The rim 15' is formed with holes 16 of the same size as the holes in the outer rim to admit of the free sliding movements of the tread forming members or plungers 7' which in this case are of tubular formation throughout and left open at the inner ends thereof where they are formed with means 17 for limiting the outward radial sliding movements thereof. The means 17 may consist either of a collar or flange at the inner end of the tread forming member 7' or it may consist of a nut threaded thereon. A cushion 14' is interposed between the limiting means 17 and the intermediate rim 15' to render each plunger or member 7' silent in operation.

Under the arrangement last referred to, guiding members or studs 18 are fixedly secured to the inner rim 3' and extend radially outward therefrom and bear a telescopic relation to the respective tread forming members or plungers 7' as shown in Figs. 4 and 5. The load sustaining springs 13', under the arrangement shown in Figs. 4 and 5, are housed within the tubular tread forming members or plungers 7', bearing at their outer extremities against the heads 10' and bearing at their inner ends against the outer extremities of the studs 18. The studs 18 assist materially in the guidance of the respective tread forming members, the latter being also guided by and through the openings in the outer rim 4' and the intermediate rim 15'.

From the foregoing description taken in connection with the accompanying drawings, it will now be seen that each tread forming plunger or member is operable independently of all the remaining members. Therefore when one or more tread forming members meet an obstruction, they may yield readily so as to prevent breakage or injury thereto while other adjacent tread forming members are in supporting contact with the road surface at opposite sides of and adjacent to such obstruction. Any desired number of rows or series of tread forming members may be used in conjunction with a single wheel, from one to any desired number. For wheels intended for light service, a single row or circular series of tread forming members may be found sufficient. For wheels intended for heavier duty, the number of rows of tread forming members may be increased in proportion to the load. Any desired material may be used in the construction of the body of the wheel and the tread forming members, and the springs hereinabove referred to and illustrated in the drawings may be of any desired gage, stiffness or resiliency.

I claim:—

A vehicle wheel comprising a hub, an outer rim, an inner rim, said rims being transversely flat and concentric with the hub, spokes connecting said outer and inner rims and the hub, said outer and inner rims being formed with radially alined guide openings, and tread forming plungers slidable through and guided by said openings, each of said plungers being operable independent of the remainder thereof, a load sustaining spring encircling each plunger and supported at its inner end against said inner rim, a means carried by and of greater diameter than each plunger for limiting the outward movement thereof and bearing against the outer end of the respective spring, and a cushion interposed between said limiting means and said outer rim, said limiting means being adjustable for regulating the compression of each load sustaining spring.

In testimony whereof I affix my signature.

BRINT N. RAMSEY.